(12) United States Patent
Hatano (10) Patent No.: US 12,204,278 B2
(45) Date of Patent: Jan. 21, 2025

(54) TONER, TONER CARTRIDGE, AND IMAGE FORMING APPARATUS

(71) Applicant: Toshiba Tec Kabushiki Kaisha, Tokyo (JP)

(72) Inventor: Takumi Hatano, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 556 days.

(21) Appl. No.: 17/575,007

(22) Filed: Jan. 13, 2022

(65) Prior Publication Data

US 2022/0404728 A1    Dec. 22, 2022

(30) Foreign Application Priority Data

Jun. 11, 2021   (JP) .................... 2021-097839

(51) Int. Cl.
*G03G 9/087* (2006.01)
*C08G 63/16* (2006.01)
*G03G 9/09* (2006.01)
*G03G 9/097* (2006.01)

(52) U.S. Cl.
CPC ......... *G03G 9/08755* (2013.01); *C08G 63/16* (2013.01); *G03G 9/08782* (2013.01); *G03G 9/0904* (2013.01); *G03G 9/09725* (2013.01); *C08G 2250/00* (2013.01)

(58) Field of Classification Search
CPC .......... G03G 9/08755; G03G 9/08782; G03G 9/0904; G03G 9/09725; G03G 9/08795; G03G 9/08797; C08G 63/16; C08G 2250/00

See application file for complete search history.

(56) References Cited

U.S. PATENT DOCUMENTS

| | | | |
|---|---|---|---|
| 2003/0224278 A1 | 12/2003 | Shirai et al. | |
| 2013/0337374 A1 | 12/2013 | Sugimoto et al. | |
| 2015/0309435 A1 | 10/2015 | Kuroyama et al. | |
| 2018/0217516 A1 | 8/2018 | Nishitera | |

(Continued)

FOREIGN PATENT DOCUMENTS

| | | |
|---|---|---|
| EP | 2 187 265 A2 | 5/2010 |
| EP | 3 106 923 A1 | 12/2016 |

(Continued)

OTHER PUBLICATIONS

Extended European Search Report dated Aug. 26, 2022 issued in EP Application No. 22160395.4, 7 pages.

*Primary Examiner* — Stewart A Fraser
(74) *Attorney, Agent, or Firm* — FOLEY & LARDNER LLP (57) ABSTRACT

A toner contains a crystalline polyester resin, a non-crystalline polyester resin A having a melting temperature ranging between 99° C. to 108° C., a non-crystalline polyester resin B having a melting temperature ranging between 140° C. to 150° C., an ester wax, and a colorant. A ratio of the crystalline polyester resin is 5% mass to 15% mass to a total T of the crystalline polyester resin, the non-crystalline polyester resin A, the non-crystalline polyester resin B, the ester wax, and the colorant. A ratio of the non-crystalline polyester resin A to the total T is between 50% mass to 60% mass. A ratio of the non-crystalline polyester resin B to the total T is between 20% mass to 30% mass.

16 Claims, 1 Drawing Sheet

(56) References Cited

U.S. PATENT DOCUMENTS

| | | |
|---|---|---|
| 2018/0307151 A1 | 10/2018 | Nishitera |
| 2021/0286278 A1* | 9/2021 | Hatano .............. G03G 9/08797 |
| 2022/0043365 A1* | 2/2022 | Nakajima .......... G03G 9/08755 |
| 2023/0139049 A1* | 5/2023 | Hatano .............. G03G 9/08797 |
| | | 430/109.4 |

FOREIGN PATENT DOCUMENTS

| | | |
|---|---|---|
| JP | 2005-292473 A | 10/2005 |
| JP | 2014-182272 A | 9/2014 |

* cited by examiner

TONER, TONER CARTRIDGE, AND IMAGE FORMING APPARATUS

CROSS-REFERENCE TO RELATED APPLICATION

This application is based upon and claims the benefit of priority from Japanese Patent Application No. 2021-097839, filed on Jun. 11, 2021, the entire contents of which are incorporated herein by reference.

FIELD

Embodiments described herein relate generally to a toner, a toner cartridge, and an image forming apparatus.

BACKGROUND

A toner containing a crystalline polyester resin may be used as a low-temperature fixing toner having excellent low-temperature fixability. The low-temperature fixing toner is excellent in low-temperature fixability. A low-temperature offset is less likely to occur. On the other hand, a high-temperature offset may be likely to occur in the low-temperature fixing toner.

In addition, the low-temperature fixing toner has insufficient heat resistance. Therefore, the low-temperature fixing toner is likely to undergo thermal change in an apparatus body of an image forming apparatus or the like. As a result, when the low-temperature fixing toner is used for a long period of time, a toner scattering amount in the apparatus body is increased. Therefore, the low-temperature fixing toner has room for improvement in long life property.

DETAILED DESCRIPTION

Figure 1:
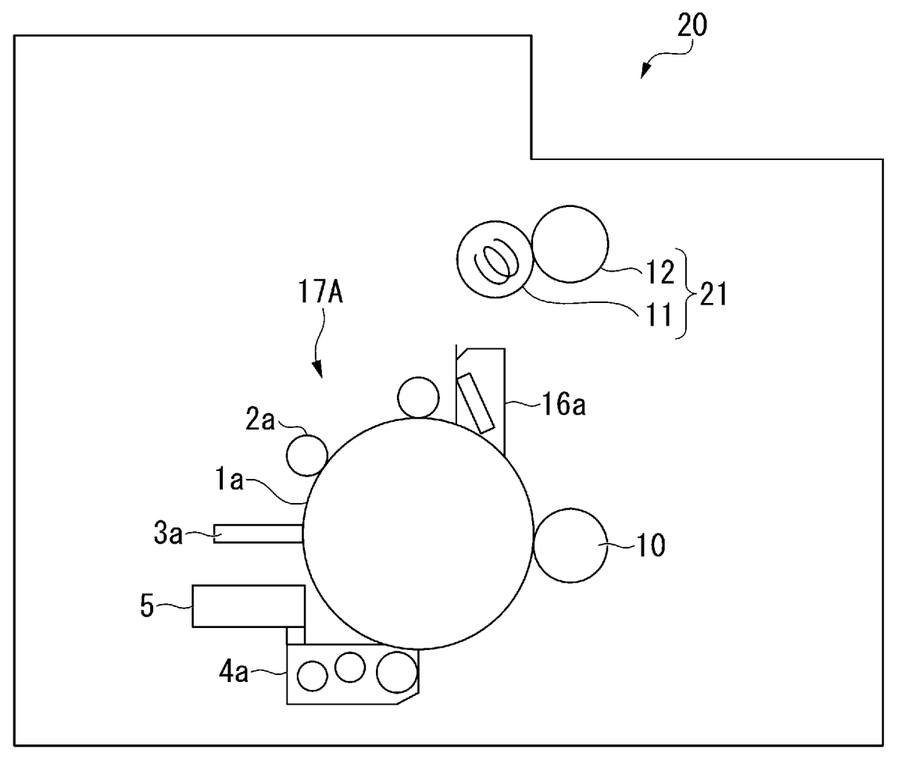
The FIGURE is a diagram illustrating an example of a schematic structure of an image forming apparatus according to at least one embodiment.

In general, according to at least one embodiment, a toner having excellent low-temperature offset resistance, high-temperature offset resistance, and long life property, and a toner cartridge and an image forming apparatus containing the toner are provided.

According to at least one embodiment, a toner contains a crystalline polyester resin, a non-crystalline polyester resin A, a non-crystalline polyester resin B, an ester wax, and a colorant.

A melting temperature of the non-crystalline polyester resin A is 99° C. to 108° C. A ratio of the non-crystalline polyester resin A is 50 mass % to 60 mass % with respect to 100 mass % of a total of the crystalline polyester resin, the non-crystalline polyester resin A, the non-crystalline polyester resin B, the ester wax, and the colorant.

A melting temperature of the non-crystalline polyester resin B is 140° C. to 150° C. A ratio of the non-crystalline polyester resin B is 20 mass % to 30 mass % with respect to 100 mass % of the total of the crystalline polyester resin, the non-crystalline polyester resin A, the non-crystalline polyester resin B, the ester wax, and the colorant.

A ratio of the crystalline polyester resin is 5 mass % to 15 mass % with respect to 100 mass % of the total of the crystalline polyester resin, the non-crystalline polyester resin A, the non-crystalline polyester resin B, the ester wax, and the colorant.

A toner according to at least one embodiment is described.

The toner according to at least one embodiment contains a crystalline polyester resin, a non-crystalline polyester resin A, a non-crystalline polyester resin B, an ester wax, and a colorant.

The crystalline polyester resin is described.

The crystalline polyester resin functions as a binder resin. The crystalline polyester resin may be used alone or in combination of two or more types thereof.

In at least one embodiment, a polyester resin having a ratio of a softening temperature to a melting temperature (softening temperature/melting temperature) of 0.8 to 1.2 is referred to as the "crystalline polyester resin". A polyester resin having a ratio of the softening temperature to the melting temperature (softening temperature/melting temperature) of less than 0.8 or more than 1.2 is referred to as the "non-crystalline polyester resin".

Examples of the crystalline polyester resin include a condensation polymer of a dihydric or polyhydric alcohol and a dihydric or polycarboxylic acid.

Examples of the dihydric or polyhydric alcohol include ethylene glycol, 1,2-propylene glycol, 1,3-propylene glycol, 1,4-butanediol, 1,5-pentanediol, 1,6-hexanediol, neopentyl glycol, 1,4-butenediol, polyoxypropylene, polyoxyethylene, glycerin, pentaerythritol, and trimethylolpropane. As the dihydric or polyhydric alcohol, 1,4-butanediol and 1,6-hexanediol are preferable.

Examples of the dihydric or polycarboxylic acid include adipic acid, oxalic acid, malonic acid, maleic acid, fumaric acid, citraconic acid, itaconic acid, glutaconic acid, succinic acid, phthalic acid, isophthalic acid, terephthalic acid, sebacic acid, azelaic acid, succinic acid substituted with an alkyl group or an alkenyl group, cyclohexanedicarboxylic acid, trimellitic acid, pyromellitic acid, and acid anhydrides or esters thereof.

Examples of the succinic acid substituted with an alkyl group or an alkenyl group include succinic acid substituted with an alkyl group or an alkenyl group having 2 to 20 carbon atoms. Examples thereof include n-dodecenylsuccinic acid and n-dodecylsuccinic acid. As the dihydric or polycarboxylic acid, fumaric acid is preferable.

However, the crystalline polyester resin is not limited to the condensation polymer of the dihydric or polyhydric alcohol and the dihydric or polycarboxylic acid exemplified here. Any one of the crystalline polyester resins may be used alone, or two or more of the crystalline polyester resins may be used in combination.

The melting point of the crystalline polyester resin is preferably 60° C. to 120° C., more preferably 70° C. to 115° C., and still more preferably 80° C. to 110° C. When the melting point of the crystalline polyester resin is equal to or higher than the lower limit value, the toner is further excellent in long life property. When the melting point of the crystalline polyester resin is equal to or lower than the upper limit value, the low-temperature fixability is further improved.

The melting point of the crystalline polyester resin can be measured, for example, as a maximum endothermic peak temperature measured by a differential scanning calorimeter (DSC).

A mass average molecular weight of the crystalline polyester resin is preferably $6 \times 10^3$ to $1.8 \times 10^4$, and more preferably $8 \times 10^3$ to $1.4 \times 10^4$. When the mass average molecular weight of the crystalline polyester resin is equal to or greater than the lower limit value, the low-temperature fixability is further improved. When the mass average molecular weight of the crystalline polyester resin is equal to or less than the upper limit value, the low-temperature offset resistance is further excellent.

The mass average molecular weight of the crystalline polyester resin is a value in terms of polystyrene obtained by gel permeation chromatography.

The non-crystalline polyester resin A is described.

The non-crystalline polyester resin A functions as a binder resin. The non-crystalline polyester resin A may be used alone or in combination of two or more types thereof.

The melting temperature of the non-crystalline polyester resin A is 99° C. to 108° C. Since the melting temperature of the non-crystalline polyester resin A is 99° C. or higher, the toner in at least one embodiment is excellent in high-temperature offset resistance. Since the melting temperature of the non-crystalline polyester resin A is 108° C. or lower, the toner in at least one embodiment is excellent in low-temperature offset resistance.

The melting temperature of the non-crystalline polyester resin A can be measured by, for example, a constant test force extrusion type capillary rheometer (flow tester).

The melting temperature of the non-crystalline polyester resin A is preferably 102° C. to 105° C. When the melting temperature of the non-crystalline polyester resin A is equal to or higher than the lower limit value of the above-described numerical range, the high-temperature offset resistance is further excellent. When the melting temperature of the non-crystalline polyester resin A is equal to or lower than the upper limit value of the above-described numerical range, the low-temperature offset resistance is further excellent.

The mass average molecular weight of the non-crystalline polyester resin A is preferably $9.0 \times 10^3$ to $1.5 \times 10^4$, more preferably $1.0 \times 10^4$ to $1.4 \times 10^4$, and still more preferably $1.1 \times 10^4$ to $1.3 \times 10^4$. When the mass average molecular weight of the non-crystalline polyester resin A is within the above-described numerical range, the melting temperature tends to be 99° C. to 108° C.

When the mass average molecular weight of the non-crystalline polyester resin A is equal to or greater than the lower limit value, the viscosity of the toner during fixing increases, and the high-temperature offset resistance is further excellent. When the mass average molecular weight of the non-crystalline polyester resin A is equal to or less than the upper limit value, the viscosity of the toner during fixing decreases. Therefore, the toner hardly adheres to a roller during fixing, and the low-temperature offset resistance is further excellent.

The mass average molecular weight of the non-crystalline polyester resin A is a value in terms of polyethylene glycol obtained by the gel permeation chromatography.

Examples of the non-crystalline polyester resin A include a condensation polymer of a dihydric or polycarboxylic acid and a dihydric or polyhydric alcohol.

Examples of the dihydric or polycarboxylic acid include a dihydric or polycarboxylic acid, an acid anhydride of a dihydric or polycarboxylic acid, and an ester of a dihydric or polycarboxylic acid. Examples of the ester of the dihydric or polycarboxylic acid include a lower alkyl (having 1 to 12 carbon atoms) ester of the dihydric or polycarboxylic acid.

Examples of the dicarboxylic acid include maleic acid, fumaric acid, citraconic acid, itaconic acid, glutaconic acid, phthalic acid, isophthalic acid, terephthalic acid, cyclohexanedicarboxylic acid, succinic acid, adipic acid, sebacic acid, azelaic acid, malonic acid, and succinic acid substituted with an alkyl group or an alkenyl group. However, the dicarboxylic acid is not limited to these examples.

Examples of the succinic acid substituted with an alkyl group or an alkenyl group include succinic acid substituted with an alkyl group or an alkenyl group having 2 to 20 carbon atoms. Examples thereof include n-dodecenylsuccinic acid and n-dodecylsuccinic acid. An acid anhydride of the dicarboxylic acid or an ester of the dicarboxylic acid may be used.

The dicarboxylic acid is preferably maleic acid, fumaric acid, terephthalic acid, or succinic acid substituted with an alkenyl group having 2 to 20 carbon atoms.

Any one of the dicarboxylic acids may be used alone, or two or more of the dicarboxylic acids may be used in combination.

Examples of trihydric or polycarboxylic acid include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, EMPOL trimer acid, and acid anhydrides or esters thereof. However, the trihydric or polycarboxylic acid is not limited to these examples.

The trihydric or polycarboxylic acid is preferably 1,2,4-benzenetricarboxylic acid (trimellitic acid), an acid anhydride thereof, or a lower alkyl (having 1 to 12 carbon atoms) ester thereof.

Any one of the trihydric or polycarboxylic acids may be used alone, or two or more of the trihydric or polycarboxylic acid may be used in combination.

Examples of the dihydric alcohol include ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, and an alkylene oxide adduct of bisphenol A. However, the dihydric alcohol is not limited to these examples.

Examples of the alkylene oxide adduct of bisphenol A include a compound obtained by adding on average 1 to 10 moles of an alkylene oxide having 2 to 3 carbon atoms to bisphenol A. Examples of the alkylene oxide adduct of bisphenol A include polyoxypropylene (2.2)-2,2-bis(4-hydroxyphenyl) propane, polyoxypropylene (3.3)-2,2-bis(4-hydroxyphenyl) propane, polyoxyethylene (2.0)-2,2-bis(4-hydroxyphenyl) propane, polyoxypropylene(2.0)-polyoxyethylene (2.0)-2,2-bis(4-hydroxyphenyl) propane, and polyoxypropylene(6)-2,2-bis(4-hydroxyphenyl) propane.

The dihydric alcohol is preferably an alkylene oxide adduct of bisphenol A. Any one of the dihydric alcohols may be used alone, or two or more of the dihydric alcohols may be used in combination.

Examples of a trihydric or polyhydric alcohol include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. However, the trihydric or polyhydric alcohol is not limited to these examples.

The trihydric or polyhydric alcohol is preferably sorbitol, 1,4-sorbitan, pentaerythritol, glycerol, or trimethylolpropane.

One of the trihydric or polyhydric alcohols may be used alone, or two or more of the trihydric or polyhydric alcohol may be used in combination.

Among the dihydric or polycarboxylic acids and the dihydric or polyhydric alcohol, a carboxylic acid and an alcohol are selected such that the melting temperature of the non-crystalline polyester resin A is 99° C. to 108° C.

The melting temperature and the mass average molecular weight of the non-crystalline polyester resin A can be adjusted by, for example, selecting types of the dihydric or polycarboxylic acid and the dihydric or polyhydric alcohol and the composition thereof, and changing a polymerization time.

When the dihydric or polyhydric alcohol and the dihydric or polycarboxylic acid are subjected to condensation polymerization, a commonly used catalyst may be used in order to promote the reaction. Examples of the catalyst include dibutyltin oxide, a titanium compound, dialkoxytin (II), tin (II) oxide, fatty acid tin (II), tin (II) dioctanoate, and tin (II) distearate.

The non-crystalline polyester resin B is described.

The non-crystalline polyester resin B functions as a binder resin. The non-crystalline polyester resin B may be used alone or in combination of two or more types thereof.

The melting temperature of the non-crystalline polyester resin B is 140° C. to 150° C. Since the melting temperature of the non-crystalline polyester resin B is 140° C. or higher, the toner in at least one embodiment is excellent in high-temperature offset resistance and long life property. Since the melting temperature of the non-crystalline polyester resin B is 150° C. or lower, the toner in at least one embodiment is excellent in low-temperature offset resistance.

The melting temperature of the non-crystalline polyester resin B can be measured by, for example, the constant test force extrusion type capillary rheometer (flow tester).

The melting temperature of the non-crystalline polyester resin B is preferably 142° C. to 148° C. When the melting temperature of the non-crystalline polyester resin B is equal to or higher than the lower limit value of the above-described numerical range, the high-temperature offset resistance and the long life property are further excellent. When the melting temperature of the non-crystalline polyester resin B is equal to or lower than the upper limit value of the above-described numerical range, the low-temperature offset resistance is further excellent.

The mass average molecular weight of the non-crystalline polyester resin B is preferably $2.5 \times 10^4$ to $3.4 \times 10^4$, more preferably $2.6 \times 10^4$ to $3.3 \times 10^4$, and still more preferably $2.7 \times 10^4$ to $3.1 \times 10^4$. When the mass average molecular weight of the non-crystalline polyester resin B is within the above-described numerical range, the melting temperature tends to be 140° C. to 150° C.

When the mass average molecular weight of the non-crystalline polyester resin B is equal to or greater than the lower limit value, the viscosity of the toner during fixing increases, and the high-temperature offset resistance is further excellent. When the mass average molecular weight of the non-crystalline polyester resin B is equal to or less than the upper limit value, the viscosity of the toner during fixing decreases, and the low-temperature offset resistance is further excellent.

The mass average molecular weight of the non-crystalline polyester resin B is a value in terms of polyethylene glycol obtained by the gel permeation chromatography.

Examples of the non-crystalline polyester resin B include a condensation polymer of a dihydric or polycarboxylic acid and a dihydric or polyhydric alcohol.

Examples of the dihydric or polycarboxylic acid and the dihydric or polyhydric alcohol are the same as those described for the non-crystalline polyester resin A. Among the dihydric or polycarboxylic acid and the dihydric or polyhydric alcohol, a carboxylic acid and an alcohol are selected such that the melting temperature is 100° C. or higher.

The melting temperature and the mass average molecular weight of the non-crystalline polyester resin B can be adjusted by, for example, selecting the types of the dihydric or polycarboxylic acid and the dihydric or polyhydric alcohol and the composition thereof, and changing the polymerization time.

From the viewpoints of the low-temperature offset resistance, the high-temperature offset resistance, and the long life property, it is preferable that the toner in at least one embodiment does not contain a non-crystalline polyester resin other than the non-crystalline polyester resin A and the non-crystalline polyester resin B. Another non-crystalline polyester resin is at least one or more selected from the group consisting of a non-crystalline polyester resin having a melting temperature of lower than 99° C., a non-crystalline polyester resin having a melting temperature of higher than 108° C. and lower than 140° C., and a non-crystalline polyester resin having a melting temperature of higher than 150° C.

The ester wax is described.

The ester wax is an ester compound that functions as a release agent. As the ester wax, the following specific ester wax α is preferable from the viewpoints of the heat resistance and the long life property of the toner.

Ester wax α: a condensation polymer of a first monomer group including at least three or more types of carboxylic acids and a second monomer group including at least two or more types of alcohols.

The ester wax α is formed of two or more types of ester compounds having different number of carbon atoms.

Regarding the ester wax α, the first monomer group is described.

From the viewpoint of easy availability of the ester wax α, the number of types of carboxylic acids in the first monomer group is preferably 7 or less, more preferably 5 or less, and still more preferably 4 or less.

Here, the number of carbon atoms of the carboxylic acid having a maximum content in the first monomer group is defined as $C_n$. The number of carbon atoms $C_n$ is preferably 19 to 28, more preferably 19 to 24, and still more preferably 20 to 24. When the number of carbon atoms $C_n$ is equal to or greater than the lower limit value, the heat resistance of the ester wax α is improved. When the number of carbon atoms $C_n$ is equal to or less than the upper limit value, the low-temperature fixability of the toner is further improved.

A ratio of the carboxylic acid having the number of carbon atoms $C_n$ and having the maximum content is preferably 70 mass % to 95 mass %, more preferably 80 mass % to 95 mass %, and still more preferably 85 mass % to 95 mass % with respect to 100 mass % of the first monomer group. When the ratio of the carboxylic acid having the number of carbon atoms $C_n$ is equal to or greater than the lower limit value, a maximum peak of the number of carbon atom distribution of the ester wax α is likely to be located on a high number of carbon atom side. Therefore, the heat resistance of the toner is improved. When the ratio of the carboxylic acid having the number of carbon atoms $C_n$ is equal to or less than the upper limit value, the ester wax α is easily available.

The ratio of the carboxylic acid having 18 or less carbon atoms in the first monomer group is preferably 0 mass % to 5 mass %, and more preferably 0 mass % to 1 mass % with respect to 100 mass % of the first monomer group. When the ratio of the carboxylic acid having 18 or less carbon atoms is equal to or greater than the lower limit value, the ester wax α is easily available. When the ratio of the carboxylic acid having 18 or less carbon atoms is equal to or less than the upper limit value, the ratio of the ester compound having a relatively low molecular weight in the ester wax α decreases. As a result, the heat resistance of the toner is improved.

The content of the carboxylic acid having each number of carbon atoms in the first monomer group can be measured, for example, by mass analysis of the ester wax α for a product after a methanolysis reaction by field desorption mass spectrometry (FD-MS).

From the viewpoint of easy availability of the ester wax α, the carboxylic acid in the first monomer group is preferably a long-chain carboxylic acid, and more preferably a long-chain alkylcarboxylic acid. The long-chain carboxylic acid is appropriately selected according to properties, performance, and the like required for the ester wax α.

The long-chain carboxylic acid is preferably a long-chain carboxylic acid having 19 to 28 carbon atoms, and more preferably a long-chain carboxylic acid having 20 to 24 carbon atoms. When the number of carbon atoms of the long-chain carboxylic acid is equal to or greater than the lower limit value, the heat resistance of the ester wax α is improved. When the number of carbon atoms of the long-chain carboxylic acid is equal to or less than the upper limit value, the low-temperature fixability of the toner is further improved.

Examples of the long-chain alkylcarboxylic acid include palmitic acid, stearic acid, arachidic acid, behenic acid, lignoceric acid, cerotic acid, and montanic acid.

Regarding the ester wax α, the second monomer group is described.

From the viewpoint of the easy availability of the ester wax α, the number of types of alcohols in the second monomer group is preferably 5 or less, more preferably 4 or less, and still more preferably 3 or less.

Here, the number of carbon atoms of an alcohol having a maximum content in the second monomer group is defined as $C_m$. The number of carbon atoms $C_m$ is preferably 19 to 28, more preferably 20 to 24, and still more preferably 20 to 22. When the number of carbon atoms $C_m$ is equal to or greater than the lower limit value, the heat resistance of the ester wax α is improved. When the number of carbon atoms $C_m$ is equal to or less than the upper limit value, the low-temperature fixability of the toner is improved.

A ratio of the alcohol having the number of carbon atoms $C_m$ and having the maximum content is preferably 70 mass % to 90 mass %, more preferably 80 mass % to 90 mass %, and still more preferably 85 mass % to 90 mass % with respect to 100 mass % of the second monomer group. When the ratio of the alcohol having the number of carbon atoms $C_m$ is equal to or greater than the lower limit value, the maximum peak of the number of carbon atom distribution of the ester wax α is likely to be located on the high number of carbon atom side. Therefore, the heat resistance of the toner is improved. When the ratio of the alcohol having the number of carbon atoms $C_m$ is equal to or less than the upper limit value, the ester wax α is easily available.

The ratio of an alcohol having 18 or less carbon atoms in the second monomer group is preferably 20 mass % or less, more preferably 10 mass % to 20 mass %, and still more preferably 15 mass % to 20 mass % with respect to 100 mass % of the second monomer group. When the ratio of the alcohol having 18 or less carbon atoms is equal to or greater than the lower limit value, the ester wax α is easily available. When the ratio of the alcohol having 18 or less carbon atoms is equal to or less than the upper limit value, the ratio of the ester compound having a relatively low molecular weight in the ester wax α decreases. Therefore, the heat resistance of the toner is improved.

The content of the alcohol having each number of carbon atoms in the second monomer group can be measured, for example, by the mass analysis of the ester wax α for the product obtained after the methanolysis reaction using the FD-MS.

From the viewpoint of easy availability of the ester wax α, the alcohol in the second monomer group is preferably a long-chain alcohol, and more preferably a long-chain alkyl alcohol. The long-chain alcohol is appropriately selected according to the properties, the performance, and the like required for the ester wax α.

The long-chain alcohol is preferably a long-chain alcohol having 19 to 28 carbon atoms, and more preferably a long-chain alcohol having 20 to 22 carbon atoms. When the number of carbon atoms of the long-chain alcohol is equal to or greater than the lower limit value, the heat resistance of the ester wax α is improved. When the number of carbon atoms of the long-chain alcohol is equal to or less than the upper limit value, the low-temperature fixability of the toner is improved.

Examples of the long-chain alkyl alcohol include palmityl alcohol, stearyl alcohol, arachidyl alcohol, behenyl alcohol, lignoceryl alcohol, ceryl alcohol, and montanyl alcohol.

In the ester wax α, an ester compound having a number of carbon atoms $C_1$ and having the maximum content, among ester compounds constituting the ester wax α, is preferably present. The number of carbon atoms $C_1$ is preferably 43 or more, more preferably 43 to 56, still more preferably 43 to 52, particularly preferably 44 to 46, and most preferably 44. When the number of carbon atoms $C_1$ is equal to or greater than the lower limit value, the heat resistance of the toner is improved. When the number of carbon atoms $C_1$ is equal to or less than the upper limit value, the ester wax α is easily available.

The ester compound having the number of carbon atoms $C_1$ is represented by the following formula (I).

$$R^1COOR^2 \quad (I)$$

In formula (I), $R^1$ and $R^2$ are alkyl groups. A total number of carbon atoms of $R^1$ and $R^2$ is preferably 42 or more, more preferably 42 to 55, still more preferably 42 to 51, particularly preferably 43 to 45, and most preferably 43. When the total number of carbon atoms of $R^1$ and $R^2$ is equal to or greater than the lower limit value, the heat resistance of the toner is improved. When the total number of carbon atoms of $R^1$ and $R^2$ is equal to or less than the upper limit value, the ester wax α is easily available. The number of carbon atoms of $R^1$ can be controlled, for example, by adjusting the number of carbon atoms $C_n$ of the carboxylic acid having the number of carbon atoms $C_n$. The number of carbon atoms of $R^2$ can be controlled, for example, by adjusting the number of carbon atoms $C_m$ of the alcohol having the number of carbon atoms $C_m$.

The ratio of the ester compound having the number of carbon atoms $C_1$ is preferably 65 mass % or more, more preferably 65 mass % to 90 mass %, still more preferably 70 mass % to 90 mass %, and particularly preferably 80 mass % to 90 mass % with respect to 100 mass % of the ester wax α. When the ratio of the ester compound having the number of carbon atoms $C_1$ is equal to or greater than the lower limit value, the maximum peak of the number of carbon atom distribution of the ester wax α is sufficiently high. As a result, the heat resistance of the toner is improved.

When the ratio of the ester compound having the number of carbon atoms $C_1$ is equal to or less than the upper limit value, the ester wax α is easily available.

The number of carbon atom distribution of the ester wax α preferably has only one maximum peak in a range having 43 or more carbon atoms. In this case, the ratio of the ester compound having a relatively low molecular weight decreases. As a result, the heat resistance of the toner is improved.

In the number of carbon atom distribution of the ester wax α, a position of the maximum peak is preferably in a range of 43 to 56 carbon atoms, more preferably in a range of 44 to 52 carbon atoms, still more preferably in a range of 44 to 46 carbon atoms, and most preferably in a range of 44 carbon atoms. When the position of the maximum peak is in the range of the number of carbon atoms equal to or greater than the lower limit value, the heat resistance of the toner is improved. When the position of the maximum peak is in the range of the number of carbon atoms equal to or less than the upper limit value, the ester wax α is easily available.

The content of the ester compound having each number of carbon atoms in the ester wax α can be measured by, for example, the mass analysis by the FD-MS.

A melting point of the ester wax α is preferably 60° C. to 85° C., more preferably 65° C. to 80° C., and still more preferably 65° C. to 75° C. When the melting point of the ester wax α is equal to or higher than the lower limit value, the heat resistance of the toner is improved. In addition, an offset is less likely to occur in a high-temperature environment. When the melting point of the ester wax α is equal to or lower than the upper limit value, the low-temperature fixability of the toner is improved.

The melting point of the ester wax α can be measured, for example, as a maximum endothermic peak temperature by the DSC.

The ester wax α can be synthesized, for example, by subjecting the long-chain carboxylic acid and the long-chain alcohol to an esterification reaction. In the esterification reaction, it is preferable to use at least three or more types of long-chain alkylcarboxylic acids and at least two or more types of long-chain alkyl alcohols. The number of carbon atom distribution of the ester compound contained in the ester wax α can be adjusted by adjusting the number of carbon atoms and the use amount of each of the long-chain alkylcarboxylic acid and the long-chain alkyl alcohol.

The esterification reaction can be performed, for example, while performing heating under a nitrogen stream. An esterification reaction product may be dissolved in a solvent containing ethanol, toluene, or the like, and further added with a basic aqueous solution such as a sodium hydroxide aqueous solution to separate into an organic layer and an aqueous layer, followed by purification. By removing the aqueous layer, the ester wax α is obtained. The purification operation is preferably repeated a plurality of times.

The colorant is described.

The colorant is not particularly limited. Examples thereof include carbon black, cyan, yellow, and magenta pigments and dyes.

Examples of carbon black include aniline black, lamp black, acetylene black, furnace black, thermal black, channel black, and Ketjen black.

Examples of the pigments and dyes include Fast Yellow Benzidine Yellow, Chrome Yellow, Quinoline Yellow, Indo-Fast Orange, Irgazin Red, Carmine FB, Permanent Bordeaux FRR, Pigment Orange R, Lithol Red 2G, Lake Red C, Rhodamine FB, Rhodamine B Lake, DuPont Oil Red, Phthalocyanine Blue, Pigment Blue, Aniline Blue, Calco oil Blue, Ultramarine Blue, Brilliant Green B, Phthalocyanine Green, Malachite Green Oxalate, Methylene Blue Chloride, Rose Bengal, and Quinacridone.

Examples of the colorant include, in terms of color index number, C.I. Pigment Black 1, 6, 7, C.I. Pigment Yellow 1, 12, 14, 17, 34, 74, 83, 97, 155, 180, 185, C.I. Pigment Orange 48, 49, C.I. Pigment Red 5, 12, 31, 48, 48:1, 48:2, 48:3, 48:4, 48:5, 49, 53, 53:1, 53:2, 53:3, 57, 57:1, 81, 81:4, 122, 146, 150, 177, 185, 202, 206, 207, 209, 238, 269, C.I. Pigment Blue 15, 15:1, 15:2, 15:3, 15:4, 15:5, 15:6, 75, 76, 79, C.I. Pigment Green 1, 7, 8, 36, 42, 58, C.I. Pigment Violet 1, 19, 42, and C.I. Acid Red 52.

Other components are described.

The toner in at least one embodiment may further contain components other than the crystalline polyester resin, the non-crystalline polyester resin A, the non-crystalline polyester resin B, the ester wax, and the colorant as long as the effects disclosed in at least one embodiment can be obtained.

Examples of other components include additives such as other binder resins, a charge control agent, a surfactant, a basic compound, an aggregating agent, a pH adjusting agent, and an antioxidant. However, the additives are not limited to these examples. Any one of the additives may be used alone, or two or more of the additives may be used in combination.

Other binder resins are described.

The other binder resins are binder resins other than the crystalline polyester resin, the non-crystalline polyester resin A, and the non-crystalline polyester resin B. Examples of the other binder resins include a styrene-based resin, an ethylene-based resin, an acrylic resin, a phenol-based resin, an epoxy-based resin, an allyl phthalate-based resin, a polyamide-based resin, and a maleic acid-based resin. However, the other binder resins are not limited to the examples.

Any one of the other binder resins may be used alone, or two or more of the other binder resins may be used in combination.

The styrene-based resin, the ethylene-based resin, the acrylic resin, the phenol-based resin, the epoxy-based resin, the allyl phthalate-based resin, the polyamide-based resin, and the maleic acid-based resin are obtained, for example, by polymerizing a vinyl polymerizable monomer alone or in a plurality of types.

Examples of the vinyl polymerizable monomer include an aromatic vinyl monomer, an ester-based monomer, a carboxylic acid-containing monomer, and an amine-based monomer.

Examples of the aromatic vinyl monomer include styrene, methylstyrene, methoxystyrene, phenylstyrene, chlorostyrene, and derivatives thereof.

Examples of the ester-based monomer include methyl acrylate, ethyl acrylate, butyl acrylate, methyl methacrylate, ethyl methacrylate, butyl methacrylate, and derivatives thereof.

Examples of the carboxylic acid-containing monomer include acrylic acid, methacrylic acid, fumaric acid, maleic acid, and derivatives thereof.

Examples of the amine-based monomer include aminoacrylate, acrylamide, methacrylamide, vinylpyridine, vinylpyrrolidone, and derivatives thereof.

The other binder resins may be obtained by polycondensation of a polymerizable monomer component formed of an alcohol component and a carboxylic acid component. In the polycondensation of the polymerizable monomer component, various auxiliary agents such as a chain transfer agent, a crosslinking agent, a polymerization initiator, a surfactant, an aggregating agent, a pH adjusting agent, and an antifoaming agent may be used.

The charge control agent is described.

When the toner contains the charge control agent, the toner is easily transferred to a recording medium such as paper. Examples of the charge control agent include a metal-containing azo compound, a metal-containing salicylic acid derivative compound, a metal oxide hydrophobized product, and an inclusion compound of polysaccharide. The metal-containing azo compound is preferably a complex or a complex salt of iron, cobalt, or chromium as a metal, or a mixture thereof. The metal-containing salicylic acid derivative compound and the metal oxide hydrophobized product are preferably a complex or a complex salt of zirconium, zinc, chromium, or boron as a metal, or a mixture thereof. The inclusion compound of the polysaccharide is preferably an inclusion compound of a polysaccharide containing aluminum (Al) and magnesium (Mg).

The ratio of each component of the toner is described.

The ratio of the crystalline polyester resin is 5 mass % to 15 mass % with respect to a total 100 mass % of the crystalline polyester resin, the non-crystalline polyester resin A, the non-crystalline polyester resin B, the ester wax, and the colorant. Since the ratio of the crystalline polyester resin is equal to or greater than the lower limit value of the above-described numerical range, the toner in at least one embodiment is excellent in low-temperature offset resistance. Since the ratio of the crystalline polyester resin is equal to or less than the upper limit value of the above-described numerical range, the toner in at least one embodiment is excellent in long life property.

From these viewpoints, the ratio of the crystalline polyester resin is preferably 5 mass % to 15 mass %, and more preferably 7 mass % to 13 mass %, with respect to the total 100 mass % of the crystalline polyester resin, the non-crystalline polyester resin A, the non-crystalline polyester resin B, the ester wax, and the colorant.

The ratio of the non-crystalline polyester resin A is 50 mass % to 60 mass % with respect to the total 100 mass % of the crystalline polyester resin, the non-crystalline polyester resin A, the non-crystalline polyester resin B, the ester wax, and the colorant. Since the ratio of the non-crystalline polyester resin A is equal to or greater than the lower limit value of the above-described numerical range, the toner in at least one embodiment is excellent in low-temperature offset resistance. Since the ratio of the non-crystalline polyester resin A is equal to or less than the upper limit value of the above-described numerical range, the toner in at least one embodiment is excellent in high-temperature offset resistance.

From these viewpoints, the ratio of the non-crystalline polyester resin A is preferably 52 mass % to 58 mass %, and more preferably 53 mass % to 57 mass %, with respect to the total 100 mass % of the crystalline polyester resin, the non-crystalline polyester resin A, the non-crystalline polyester resin B, the ester wax, and the colorant.

The ratio of the non-crystalline polyester resin B is 20 mass % to 30 mass % with respect to the total 100 mass % of the crystalline polyester resin, the non-crystalline polyester resin A, the non-crystalline polyester resin B, the ester wax, and the colorant. Since the ratio of the non-crystalline polyester resin B is equal to or greater than the lower limit value of the above-described numerical range, the toner in at least one embodiment is excellent in high-temperature offset resistance. Since the ratio of the non-crystalline polyester resin A is equal to or less than the upper limit value of the above-described numerical range, the toner in at least one embodiment is excellent in low-temperature offset resistance.

From these viewpoints, the ratio of the non-crystalline polyester resin B is preferably 22 mass % to 28 mass %, and more preferably 23 mass % to 27 mass %, with respect to the total 100 mass % of the crystalline polyester resin, the non-crystalline polyester resin A, the non-crystalline polyester resin B, the ester wax, and the colorant.

The ratio of the ester wax is preferably 3 mass % to 10 mass %, more preferably 4 mass % to 9 mass %, and still more preferably 5 mass % to 8 mass % with respect to the total 100 mass % of the crystalline polyester resin, the non-crystalline polyester resin A, the non-crystalline polyester resin B, the ester wax, and the colorant. When the content of the ester wax is equal to or greater than the lower limit value, the low-temperature offset resistance is further improved. When the ratio of the ester wax is equal to or less than the upper limit value, the long life property is further excellent.

The content of the colorant is preferably 3 mass % to 10 mass %, and more preferably 4 mass % to 8 mass %, with respect to the total 100 mass % of the crystalline polyester resin, the non-crystalline polyester resin A, the non-crystalline polyester resin B, the ester wax, and the colorant. When the content of the colorant is equal to or greater than the lower limit value, the toner is excellent in color reproducibility. When the content of the colorant is equal to or less than the upper limit value, the dispersibility of the colorant is improved, and the toner is further excellent in low-temperature fixability. In addition, it is easy to control a charge amount of the toner.

An ester wax residual ratio in the toner is described.

The ester wax residual ratio functions as an index of the long life property. The ester wax residual ratio is calculated by the following equation.

$$\text{Ester wax residual ratio (\%)} = (W_1/W_0) \times 100$$

In the equation, $W_0$ is an endothermic amount (J/g) measured using the DSC for the toner; and $W_1$ is an endothermic amount (J/g) measured using the DSC for particles obtained by heating a dispersion liquid containing the toner, water, and a surfactant at 50° C. for 1 hour, then leaving the dispersion liquid at rest until a temperature thereof decreases to a room temperature, and then removing a supernatant liquid of the dispersion liquid to obtain a solid content, and drying the solid content. Here, the surfactant is not particularly limited. Any of a cationic surfactant, an anionic surfactant, an amphoteric surfactant, and a nonionic surfactant may be used.

Since the toner in at least one embodiment contains a high molecular weight component such as the non-crystalline polyester resin B, the dispersibility of the ester wax is likely to deteriorate. As a result, the ester wax is easily exposed on a particle surface of the toner, and the long life property is easily deteriorated.

The ester wax residual ratio is preferably 75% to 95%, more preferably 78% to 92%, and still more preferably 81% to 89%. When the ester wax residual ratio is equal to or greater than the lower limit value, the long life property is further excellent.

Toner mother particles are described.

The toner in at least one embodiment may contain the toner mother particles. The toner mother particles contain the crystalline polyester resin, the non-crystalline polyester resin A, the non-crystalline polyester resin B, the ester wax, and the colorant.

A total ratio of the crystalline polyester resin, the non-crystalline polyester resin A, the non-crystalline polyester resin B, the ester wax, and the colorant is not particularly limited as long as the effects disclosed in at least one embodiment can be obtained. For example, the ratio is preferably 97 mass % to 100 mass %, and more preferably 100 mass % with respect to 100 mass % of the toner mother particles.

When the toner contains other components, from the viewpoints of the low-temperature offset resistance, the high-temperature offset resistance, and the long life property, the ratio of the other components is preferably 0.1 mass % to 3 mass %, and more preferably 0 mass %, with respect to 100 mass % of the toner mother particles.

An external additive is described.

The toner in at least one embodiment may include the toner mother particles and the external additive. The external additive adheres to surfaces of the toner mother particles.

Examples of the external additive include particles made of an inorganic oxide. Particles made of the inorganic oxide may be surface-treated with a hydrophobizing agent from the viewpoint of improving stability.

Examples of the inorganic oxide include silica, titania, alumina, strontium titanate, titanium oxide, and tin oxide.

Any one of the external additives may be used alone, or two or more of the external additives may be used in combination.

The silica comprises particles of silicon dioxide. The silica is not particularly limited. Examples of the silica include wet silica, calcined silica, and hydrophobic silica, and various silicas can be used in addition to these examples.

The wet silica can be produced, for example, by a method (liquid phase method) in which sodium silicate, using silica sand as a raw material, is used as a raw material, an aqueous solution containing sodium silicate is neutralized to precipitate silica, and the silica is filtered and dried. On the other hand, the calcined silica (dry silica) is obtained by reacting silicon tetrachloride in a high-temperature flame.

A degree of hydrophobization of the hydrophobic silica can be measured by, for example, the following method. 50 ml of ion-exchanged water and 0.2 g of a sample are placed into a beaker, and methanol is added dropwise from a burette while stirring with a magnetic stirrer. Next, as the concentration of methanol in the beaker increases, powder gradually settles, and a volume % of the methanol in a mixed solution of methanol and the ion-exchanged water at an end point at which a total amount of the powder settles is defined as the degree of hydrophobization (%).

The content of the external additive is preferably 2 to 15 parts by mass, more preferably 4 to 10 parts by mass, and still more preferably 4 to 8 parts by mass with respect to 100 parts by mass of the toner mother particles. When the content of the external additive is equal to or greater than the lower limit value, it is easy to sufficiently secure the charge amount of the toner. When the content of the external additive is equal to or less than the upper limit value, the charge amount of the toner is not excessively high. Therefore, the charge amount of the toner is likely to be appropriately maintained.

A method for producing the toner is described.

The toner can be produced by, for example, a kneading and pulverizing method or a chemical method.

The kneading and pulverizing method is described.

Examples of the kneading and pulverizing method include a production method including the following mixing act, kneading act, and pulverizing act. The following classification act may be included as necessary.

Mixing act: mixing at least the crystalline polyester resin, the non-crystalline polyester resin A, the non-crystalline polyester resin B, the ester wax, and the colorant to obtain a mixture.

Kneading act: melt-kneading the mixture to obtain a kneaded product.

Pulverizing act: pulverizing the kneaded product to obtain a pulverized product.

Classification act: classifying the pulverized product.

In the mixing act, raw materials of the toner are mixed to obtain a mixture. In the mixing act, a mixer may be used. The mixer is not particularly limited. In the mixing act, other binder resins and other components may be used as necessary.

In the kneading act, the mixture obtained in the mixing act is melt-kneaded to obtain a kneaded product. In the kneading act, a kneader may be used. The kneader is not particularly limited.

In the pulverizing act, the kneaded product obtained in the kneading act is pulverized to obtain a pulverized product. In the pulverizing act, a pulverizer may be used. As the pulverizer, various pulverizers such as a hammer mill can be used. The pulverized product obtained by the pulverizer may be further finely pulverized. As a pulverizer for further finely pulverizing the pulverized product, various pulverizers can be used. The pulverized product obtained in the pulverizing act may be used as the toner mother particles as it is, or may be used as the toner mother particles through the classification act as necessary.

In the classification act, the pulverized product obtained in the pulverizing act is classified. In the classification act, a classifier may be used. The classifier is not particularly limited.

The chemical method is described.

In the chemical method, the crystalline polyester resin, the non-crystalline polyester resin A, the non-crystalline polyester resin B, the ester wax, the colorant, and if necessary, other binder resins and other components are mixed to obtain a mixture. Next, the mixture is melt-kneaded to obtain a kneaded product. Next, the kneaded product is pulverized to obtain roughly granulated medium-sized particles. Next, the medium-sized particles are mixed with an aqueous medium to prepare a mixed liquid. Next, the mixed liquid is subjected to mechanical shearing to obtain fine particle dispersion liquid. Finally, fine particles are aggregated in the fine particle dispersion liquid to obtain the toner mother particles.

A method of mixing the external additive is described.

The external additive is mixed with the toner mother particles by, for example, a mixer. The mixer is not particularly limited. By mixing the external additive and the toner mother particles, the external additive adheres to the surfaces of the toner mother particles.

The external additive may be sieved by a sieving device as necessary. The sieving device is not particularly limited. Various sieving devices can be used.

The toner in at least one embodiment described above is excellent in low-temperature offset resistance, high-temperature offset resistance, and long life property.

A toner cartridge in at least one embodiment is described.

The toner cartridge in at least one embodiment contains the toner in the at least one embodiment described above. For example, the toner cartridge includes a container, and the toner in at least one embodiment is contained in the container. The container is not particularly limited, and various containers applicable to an image forming apparatus can be used.

The toner in at least one embodiment may be used as a one-component developer, or may be used as a two-component developer in combination with a carrier.

Hereinafter, an image forming apparatus in at least one embodiment is described with reference to the drawings.

The FIGURE is a diagram illustrating an example of a schematic structure of an image forming apparatus according to at least one embodiment.

An image forming apparatus 20 in at least one embodiment includes an apparatus main body including an image forming unit 17A (e.g., an image forming device) and a fixing device 21. The fixing device 21 is provided downstream the image forming unit 17A.

The image forming unit 17A includes a photoconductor drum 1a, a cleaning device 16a, a charging device 2a, an exposure device 3a, a developing device 4a, and a transfer roller 10. The cleaning device 16a, the charging device 2a, the exposure device 3a, the developing device 4a, and the transfer roller 10 are provided in this order along a rotation direction of the photoconductor drum 1a.

The developing device 4a contains the toner in the above-described at least one embodiment. In the image forming apparatus 20, the toner can be supplied from a toner cartridge 5.

The fixing device 21 is provided downstream the image forming unit 17A. The fixing device 21 includes a heat roller 11 and a press roller 12 that are disposed so as to face each other. The fixing device 21 is a device for fixing a toner image on a recording medium. The toner image is fixed to paper by being heated and pressed by the heat roller 11 and the press roller 12.

The image forming apparatus 20 forms an image, for example, as follows.

First, the charging device 2a uniformly charges the photoconductor drum 1a. Next, exposure is performed by the exposure device 3a to form an electrostatic latent image on the photoconductor drum 1a. Next, development is performed with the toner in at least one embodiment supplied from the developing device 4a to obtain a toner image on the photoconductor drum 1a. Next, the toner image is directly transferred from the photoreceptor drum 1a to the recording medium by the transfer roller 10 to form an image. The toner remaining on the photoreceptor drum 1a is removed by the cleaning device 16a.

The image forming apparatus shown in the FIGURE is a form in which the toner image is fixed. However, the image forming apparatus in at least one embodiment is not limited to this form. The image forming apparatus according to at least one embodiment may be, for example, an inkjet image forming apparatus.

Examples

Hereinafter, Examples are described, and at least one embodiment is described in more detail.

The melting temperature ($Tm_A$) and the mass average molecular weight (Mw) of the non-crystalline polyester resin A used in each Example are as follows.

Non-crystalline polyester resin A1 ($Tm_A$: 104° C., Mw: $1.2 \times 10^4$)

Non-crystalline polyester resin A2 ($Tm_A$: 99° C., Mw: $9.2 \times 10^3$)

Non-crystalline polyester resin A3 ($Tm_A$: 108° C., Mw: $1.4 \times 10^4$)

Non-crystalline polyester resin A4 ($Tm_A$: 98° C., Mw: $8.7 \times 10^3$)

Non-crystalline polyester resin A5 ($Tm_A$: 110° C., Mw: $1.6 \times 10^4$)

The melting temperature ($Tm_B$) and the mass average molecular weight (Mw) of the non-crystalline polyester resin B used in each Example are as follows.

Non-crystalline polyester resin B1 ($Tm_B$: 145° C., Mw: $2.9 \times 10^4$)

Non-crystalline polyester resin B2 ($Tm_B$: 140° C., Mw: $3.2 \times 10^4$)

Non-crystalline polyester resin B3 ($Tm_B$: 150° C., Mw: $2.6 \times 10^4$)

Non-crystalline polyester resin B4 ($Tm_B$: 138° C., Mw: $3.4 \times 10^4$)

Non-crystalline polyester resin B5 ($Tm_B$: 152° C., Mw: $2.4 \times 10^4$)

Non-crystalline polyester resin B6 ($Tm_B$: 132° C., Mw: $9.0 \times 10^4$)

The method of measuring the melting temperature (Tm) of the non-crystalline polyester resin A or B is described.

The toner of each Example was molded into a pellet shape by applying pressure with a pressure applying machine. For the pellet, the melting temperature (Tm) of the non-crystalline polyester resin A or B was measured using a flow tester "CFT-500D" manufactured by Shimadzu Corporation under the following conditions.

Measurement start temperature: 30° C.
Measurement end temperature: 200° C.
Load: 10 kgf
Temperature increase rate: 10° C./min In the flow tester, a temperature corresponding to a midpoint (½) between an outflow start temperature at which a melt outflow was started and an outflow end temperature at which the entire sample was melted was defined as the melting temperature (Tm).

The crystalline polyester resin used in each Example has a melting point of 101° C. and a mass average molecular weight (Mw) of $9.5 \times 10^3$.

The method of measuring the melting points of the ester wax and the crystalline polyester resin is described.

The melting point of the ester wax was measured by DSC "DSC Q2000 (manufactured by TA Instruments)". The measurement conditions are as follows.

Sample amount: 5 mg
Lid and pan: alumina
Temperature increase rate: 10° C./min

Measurement method: The temperature of the sample is increased from 20° C. to 200° C. Thereafter, the sample is cooled to 20° C. or lower. The sample was heated again, and the maximum endothermic peak temperature measured in a temperature range of around 55° C. to 80° C. was defined as the melting point.

The melting point of the crystalline polyester resin was also measured in the same manner as described above. However, the sample was heated again, and the maximum endothermic peak temperature measured in a temperature range of about 75° C. to 120° C. was defined as the melting point of the crystalline polyester resin.

Preparation of the ester wax used in Examples is described.

A four-necked flask equipped with a stirrer, a thermocouple, and a nitrogen inlet tube was charged with 80 parts by mass of at least three or more types of long-chain alkylcarboxylic acids and 20 parts by mass of at least two or more types of long-chain types of alkyl alcohols. An esterification reaction was carried out at 220° C. under a nitrogen stream to obtain a reaction product. A mixed solvent of toluene and ethanol was added to the obtained reaction product to dissolve the reaction product. Further, a sodium hydroxide aqueous solution was added to the flask, and the mixture was stirred at 70° C. for 30 minutes. The flask was further left at rest for 30 minutes to separate the contents in the flask into an organic layer and an aqueous layer, and the aqueous layer was removed from the contents. Thereafter, ion exchange water was added to the flask, and the mixture was stirred at 70° C. for 30 minutes. The flask was left at rest for 30 minutes to separate the contents in the flask into an aqueous layer and an organic layer, and the aqueous layer was removed from the contents. The operation was repeated five times. The solvent was distilled off from the organic layer of the contents in the flask under reduced pressure to obtain the ester wax.

The long-chain alkylcarboxylic acids used are as follows.
Palmitic acid ($C_{16}H_{32}O_2$)
Stearic acid ($C_{18}H_{36}O_2$)
Arachidic acid ($C_{20}H_{40}O_2$)
Behenic acid ($C_{22}H_{44}O_2$)
Lignoceric acid ($C_{24}H_{48}O_2$)
Cerotic acid ($C_{26}H_{52}O_2$)
Montanic acid ($C_{28}H_{56}O_2$)

The long-chain alkyl alcohols used are as follows.
Palmityl alcohol ($C_{16}H_{34}O$)
Stearyl alcohol ($C_{18}H_{38}O$)
Arachidyl alcohol ($C_{20}H_{42}O$)
Behenyl alcohol ($C_{22}H_{46}O$)
Lignoceryl alcohol ($C_{24}H_{50}O$)
Ceryl alcohol ($C_{26}H_{54}O$)
Montanyl alcohol ($C_{28}H_{58}O$)

The method of measuring the number of carbon atom distribution of the ester compound constituting the ester wax (the ratio of the ester compound having each number of carbon atoms) is described.

0.5 g of the toner of each Example was weighed and contained in an Erlenmeyer flask. Next, 2 mL of methylene chloride was added to the Erlenmeyer flask to dissolve the toner. Further, 4 ml of hexane was added to the Erlenmeyer flask to prepare a mixed liquid. The mixed liquid was filtered and separated into a filtrate and an insoluble matter. The solvent was distilled off from the filtrate under a nitrogen stream to obtain a precipitate. For the precipitate, the number of carbon atom distribution of the ester compound in the ester wax extracted from the toner was measured.

The ratio of the ester compound having each number of carbon atoms was measured by FD-MS "JMS-T100GC (manufactured by JEOL Ltd.)". The measurement conditions are as follows.
Sample concentration: 1 mg/ml (solvent: chloroform)
Cathode voltage: –10 kv
Spectrum recording interval: 0.4 s
Measurement mass range (m/z): 10 to 2000

A total ion strength of the ester compound having each number of carbon atoms obtained by the measurement was taken as 100. A relative value of the ion strength of the ester compound having each number of carbon atoms to the total was determined. The relative value was defined as the ratio of the ester compound having each number of carbon atoms in the ester wax. The number of carbon atoms in the ester compound having the number of carbon atoms at which the relative value was the maximum was defined as $C_1$.

The method for analyzing the first monomer group and the second monomer group is described.

1 g of each ester wax was subjected to a methanolysis reaction at a temperature of 70° C. for 3 hours. A product after the methanolysis reaction was subjected to the mass analysis by the FD-MS to determine a content of the long-chain alkylcarboxylic acid having each number of carbon atoms and a content of the long-chain alkyl alcohol having each number of carbon atoms.

The method of measuring the number of carbon atom distribution of the carboxylic acid constituting the first monomer group (the ratio of the carboxylic acid having each number of carbon atoms) is described.

The ratio of the carboxylic acid having each number of carbon atoms was measured by the FD-MS "JMS-T100GC (manufactured by JEOL Ltd.)". The measurement conditions are as follows.
Sample concentration: 1 mg/ml (solvent: chloroform)
Cathode voltage: –10 kv
Spectrum recording interval: 0.4 S
Measurement mass range (m/z): 10 to 2000

A total ion strength of the carboxylic acid having each number of carbon atoms obtained by the measurement was taken as 100. A relative value of the ion strength of the carboxylic acid having each number of carbon atoms to the total was determined. The relative value was defined as the ratio of the carboxylic acid having each number of carbon atoms in the ester wax. The number of carbon atoms in the carboxylic acid having the number of carbon atoms at which the relative value was the maximum was defined as $C_n$.

The method of measuring the number of carbon atom distribution of the alcohol constituting the second monomer group (the ratio of the alcohol having each number of carbon atoms) is described.

The ratio of the alcohol having each number of carbon atoms was measured by FD-MS "JMS-T100GC (manufactured by JEOL Ltd.)". The measurement conditions are as follows.
Sample concentration: 1 mg/ml (solvent: chloroform)
Cathode voltage: –10 kv
Spectrum recording interval: 0.4 s
Measurement mass range (m/z): 10 to 2000

A total ion strength of the alcohol having each number of carbon atoms obtained by the measurement was taken as 100. A relative value of the ion strength of the alcohol having each number of carbon atoms to the total was determined. The relative value was defined as the ratio of the alcohol having each number of carbon atoms in the ester wax. The number of carbon atoms in the alcohol having the number of carbon atoms at which the relative value was the maximum was defined as $C_m$.

The number of carbon atoms $C_1$ of the ester compound, having a maximum content of the ester wax and used in Examples, was 44. The ratio of the ester compound having the number of carbon atoms $C_1$ to 100 mass % of the ester wax was 70 mass %.

The number of types of carboxylic acids in the first monomer group was 4. The number of carbon atoms $C_n$ of the carboxylic acid, having the maximum content in the first monomer group, was 22. The ratio of the carboxylic acid having the number of carbon atoms $C_n$ to 100 mass % in the first monomer group was 70 mass %. A total ratio of the carboxylic acid having 18 or less carbon atoms to 100 mass % of the first monomer group was 3 mass %.

The number of types of alcohols in the second monomer group was 3. The number of carbon atoms $C_m$ of the alcohol, having the maximum content in the second monomer group, was 22. The ratio of the alcohol having the number of carbon atoms $C_m$ to 100 mass % of the second monomer group was 70 mass %. A total ratio of the alcohol having 18 or less carbon atoms to 100 mass % of the second monomer group was 15 mass %.

The number of carbon atom distribution of the ester wax used in Examples had only one maximum peak in a region having 43 or more carbon atoms.

The colorant used in each Example was carbon black (#44, Mitsubishi Chemical).

A toner of Example 1 was produced as follows.

First, the following raw materials for toner mother particles were put into and mixed in a Henschel mixer (manufactured by Mitsui Mining Co., Ltd.). Further, the mixture of the raw materials of the toner mother particles was melt-kneaded by a twin-screw extruder. The melt-kneaded product was cooled and then coarsely pulverized with a hammer mill. The coarsely pulverized product was finely pulverized by a jet pulverizer. The finely pulverized product was classified to obtain the toner mother particles. The volume average diameter of the toner mother particles was 8.5 μm. The volume average diameter of the toner mother particles was measured by a laser diffraction particle size distribution measuring device ((SALD7000) manufactured by Shimadzu Corporation).

The composition of the raw materials of the toner mother particles is shown below.

| | |
|---|---|
| Non-crystalline polyester resin A1 | 55 parts by mass |
| Non-crystalline polyester resin B1 | 25 parts by mass |
| Crystalline polyester resin | 10 parts by mass |
| Ester wax | 5 parts by mass |
| Carbon black | 5 parts by mass |

Next, an external additive having the following composition was mixed with 100 parts by mass of the toner mother particles of Example 1 using the Henschel mixer to produce the toner of Example 1.

| | |
|---|---|
| Hydrophobic silica particles | 1.5 parts by mass |
| Titanium oxide | 0.4 parts by mass |

A toner of Example 2 was produced as follows.

First, toner mother particles of Example 2 were produced in the same manner as in Example 1 except that the composition of the raw materials of the toner mother particles was changed as follows. Next, the toner mother particles and the external additive were mixed in the same manner as in Example 1 to produce the toner of Example 2.

| | |
|---|---|
| Non-crystalline polyester resin A2 | 55 parts by mass |
| Non-crystalline polyester resin B2 | 25 parts by mass |
| Crystalline polyester resin | 10 parts by mass |
| Ester wax | 5 parts by mass |
| Carbon black | 5 parts by mass |

A toner of Example 3 was produced as follows.

First, toner mother particles of Example 3 were produced in the same manner as in Example 1 except that the composition of the raw materials of the toner mother particles was changed as follows. Next, the toner mother particles and the external additive were mixed in the same manner as in Example 1 to produce the toner of Example 3.

| | |
|---|---|
| Non-crystalline polyester resin A3 | 55 parts by mass |
| Non-crystalline polyester resin B3 | 25 parts by mass |
| Crystalline polyester resin | 10 parts by mass |
| Ester wax | 5 parts by mass |
| Carbon black | 5 parts by mass |

A toner of Example 4 was produced as follows.

First, toner mother particles of Example 4 were produced in the same manner as in Example 1 except that the composition of the raw materials of the toner mother particles was changed as follows. Next, the toner mother particles and the external additive were mixed in the same manner as in Example 1 to produce the toner of Example 4.

| | |
|---|---|
| Non-crystalline polyester resin A1 | 50 parts by mass |
| Non-crystalline polyester resin B1 | 30 parts by mass |
| Crystalline polyester resin | 10 parts by mass |
| Ester wax | 5 parts by mass |
| Carbon black | 5 parts by mass |

A toner of Example 5 was produced as follows.

First, toner mother particles of Example 5 were produced in the same manner as in Example 1 except that the composition of the raw materials of the toner mother particles was changed as follows. Next, the toner mother particles and the external additive were mixed in the same manner as in Example 1 to produce the toner of Example 5.

| | |
|---|---|
| Non-crystalline polyester resin A1 | 60 parts by mass |
| Non-crystalline polyester resin B1 | 20 parts by mass |
| Crystalline polyester resin | 10 parts by mass |
| Ester wax | 5 parts by mass |
| Carbon black | 5 parts by mass |

A toner of Example 6 was produced as follows.

First, toner mother particles of Example 6 were produced in the same manner as in Example 1 except that the composition of the raw materials of the toner mother particles was changed as follows. Next, the toner mother particles and the external additive were mixed in the same manner as in Example 1 to produce the toner of Example 6.

| | |
|---|---|
| Non-crystalline polyester resin A1 | 58 parts by mass |
| Non-crystalline polyester resin B1 | 27 parts by mass |
| Crystalline polyester resin | 5 parts by mass |
| Ester wax | 5 parts by mass |
| Carbon black | 5 parts by mass |

A toner of Example 7 was produced as follows.

First, toner mother particles of Example 7 were produced in the same manner as in Example 1 except that the composition of the raw materials of the toner mother particles was changed as follows. Next, the toner mother particles and the external additive were mixed in the same manner as in Example 1 to produce the toner of Example 7.

| | |
|---|---|
| Non-crystalline polyester resin A1 | 52 parts by mass |
| Non-crystalline polyester resin B1 | 23 parts by mass |
| Crystalline polyester resin | 15 parts by mass |

| Ester wax | 5 parts by mass |
| --- | --- |
| Carbon black | 5 parts by mass |

A toner of Comparative Example 1 was produced as follows.

First, toner mother particles of Comparative Example 1 were produced in the same manner as in Example 1 except that the composition of the raw materials of the toner mother particles was changed as follows. Next, the toner mother particles and the external additive were mixed in the same manner as in Example 1 to produce the toner of Comparative Example 1.

| Non-crystalline polyester resin A4 | 55 parts by mass |
| --- | --- |
| Non-crystalline polyester resin B4 | 25 parts by mass |
| Crystalline polyester resin | 10 parts by mass |
| Ester wax | 5 parts by mass |
| Carbon black | 5 parts by mass |

A toner of Comparative Example 2 was produced as follows.

First, toner mother particles of Comparative Example 2 were produced in the same manner as in Example 1 except that the composition of the raw materials of the toner mother particles was changed as follows. Next, the toner mother particles and the external additive were mixed in the same manner as in Example 1 to produce the toner of Comparative Example 2.

| Non-crystalline polyester resin A5 | 55 parts by mass |
| --- | --- |
| Non-crystalline polyester resin B5 | 25 parts by mass |
| Crystalline polyester resin | 10 parts by mass |
| Ester wax | 5 parts by mass |
| Carbon black | 5 parts by mass |

A toner of Comparative Example 3 was produced as follows.

First, toner mother particles of Comparative Example 3 were produced in the same manner as in Example 1 except that the composition of the raw materials of the toner mother particles was changed as follows. Next, the toner mother particles and the external additive were mixed in the same manner as in Example 1 to produce the toner of Comparative Example 3.

| Non-crystalline polyester resin A1 | 65 parts by mass |
| --- | --- |
| Non-crystalline polyester resin B1 | 15 parts by mass |
| Crystalline polyester resin | 10 parts by mass |
| Ester wax | 5 parts by mass |
| Carbon black | 5 parts by mass |

A toner of Comparative Example 4 was produced as follows.

First, toner mother particles of Comparative Example 4 were produced in the same manner as in Example 1 except that the composition of the raw materials of the toner mother particles was changed as follows. Next, the toner mother particles and the external additive were mixed in the same manner as in Example 1 to produce the toner of Comparative Example 4.

| Non-crystalline polyester resin A1 | 45 parts by mass |
| --- | --- |
| Non-crystalline polyester resin B1 | 35 parts by mass |
| Crystalline polyester resin | 10 parts by mass |
| Ester wax | 5 parts by mass |
| Carbon black | 5 parts by mass |

A toner of Comparative Example 5 was produced as follows.

First, toner mother particles of Comparative Example 5 were produced in the same manner as in Example 1 except that the composition of the raw materials of the toner mother particles was changed as follows. Next, the toner mother particles and the external additive were mixed in the same manner as in Example 1 to produce the toner of Comparative Example 5.

| Non-crystalline polyester resin A1 | 40 parts by mass |
| --- | --- |
| Non-crystalline polyester resin B6 | 40 parts by mass |
| Crystalline polyester resin | 10 parts by mass |
| Ester wax | 5 parts by mass |
| Carbon black | 5 parts by mass |

A toner of Comparative Example 6 was produced as follows.

First, toner mother particles of Comparative Example 6 were produced in the same manner as in Example 1 except that the composition of the raw materials of the toner mother particles was changed as follows. Next, the toner mother particles and the external additive were mixed in the same manner as in Example 1 to produce the toner of Comparative Example 6.

| Non-crystalline polyester resin A1 | 60 parts by mass |
| --- | --- |
| Non-crystalline polyester resin B1 | 27 parts by mass |
| Crystalline polyester resin | 3 parts by mass |
| Ester wax | 5 parts by mass |
| Carbon black | 5 parts by mass |

A toner of Comparative Example 7 was produced as follows.

First, toner mother particles of Comparative Example 7 were produced in the same manner as in Example 1 except that the composition of the raw materials of the toner mother particles was changed as follows. Next, the toner mother particles and the external additive were mixed in the same manner as in Example 1 to produce the toner of Comparative Example 7.

| Non-crystalline polyester resin A1 | 50 parts by mass |
| --- | --- |
| Non-crystalline polyester resin B1 | 23 parts by mass |
| Crystalline polyester resin | 17 parts by mass |
| Ester wax | 5 parts by mass |
| Carbon black | 5 parts by mass |

The method of measuring the ester wax residual ratio is described.

The ester wax residual ratio was determined by the following equation.

$$\text{Ester wax residual ratio (\%)} = (W_1/W_0) \times 100$$

$W_0$ was an endothermic amount (J/g) measured using the DSC for the toner of each Example. $W_1$ was an endothermic amount (J/g) measured using the DSC for particles after the following treatment (1) for the toner of each Example. In the measurement of $W_0$ and $W_1$, "DSC Q2000 (manufactured by TA Instruments)" was used as the DSC.

The treatment (1) is described.

11 g of the toner, 56.8 g of ion-exchanged water, and 12.8 g of a surfactant were added to a 100 ml beaker, and the mixture was stirred using a magnetic stirrer until a toner layer disappeared on a liquid surface. Next, the 100 ml beaker was heated in an oil bath at 50° C. for 1 hour to remove the ester wax, and then left at rest until the temperature was lowered to room temperature. Thereafter, the supernatant liquid in the beaker was removed by decantation, and the ester wax thus desorbed was separated. 100 ml of ion-exchanged water was added to the toner particles from which the desorbed ester wax was separated, and the mixture was filtered using a filter paper. ADVANTEC GC90 was used as the filter paper. The toner particles separated by the filter paper were vacuum-dried for 8 hours, and the endothermic amount $W_1$ (J/g) was measured using the obtained particles.

A developer of Examples is described.

8 parts by mass of the toner of each Example was stirred with 100 parts by mass of a ferrite carrier with a tumbler mixer to obtain the developer of each Example.

The method of evaluating the low-temperature offset resistance is described.

A commercially available e-studio 5018A (manufactured by Toshiba Tech Corporation) was modified such that a fixing temperature can be changed from 100° C. to 220° C. in an increment of 1° C. Using the modified e-studio 5018A, an initial fixing temperature was set to 150° C., and 10 solid images having a toner adhesion amount of 1.0 mg/cm² were obtained. When offset and image peeling due to unfixing did not occur in all of the 10 solid images, the fixing temperature was gradually lowered, and the same operation of obtaining 10 solid images was repeated. When the offset or the image peeling occurred in the solid image even slightly, the operation was stopped. A lower limit of the fixing temperature at which no offset or image peeling occurred in the solid image was defined as a minimum fixing temperature of the toner. Based on the minimum fixing temperature, the low-temperature offset resistance was evaluated according to the following criteria. The lower the minimum fixing temperature, the better.

A: The minimum fixing temperature is 120° C. or lower.
B: The minimum fixing temperature is higher than 120° C. and 130° C. or lower.
C: The minimum fixing temperature is higher than 130° C.

The method of evaluating the high-temperature offset resistance is described.

A commercially available e-studio 5018A (manufactured by Toshiba Tech Corporation) was modified such that the fixing temperature can be changed from 100° C. to 220° C. in an increment of 1° C. Using the modified e-studio 5018A, the initial fixing temperature was set to 150° C., and 10 solid images having a toner adhesion amount of 1.0 mg/cm² were obtained. When the offset and the image peeling due to unfixing did not occur in all of the 10 solid images, the fixing temperature was gradually increased, and the same operation of obtaining 10 solid images was repeated. When the offset or the image peeling occurred in the solid image even slightly, the operation was stopped. An upper limit of the fixing temperature at which no offset or image peeling occurred in the solid image was defined as a maximum fixing temperature of the toner. Based on the maximum fixing temperature, the high-temperature offset resistance was evaluated according to the following criteria. The higher the maximum fixing temperature, the better.

A: The maximum fixing temperature is 200° C. or higher.
B: The maximum fixing temperature is 190° C. or higher and lower than 200° C.
C: The maximum fixing temperature is lower than 190° C.

The method of evaluating the long life property is described.

Using a commercially available e-studio 5018A (manufactured by Toshiba Tech Corporation), a document having a coverage rate of 8.0% was continuously copied on 200,000 sheets of A4 paper. Thereafter, the toner deposited on a lower side of a magnet roller of the developing device was absorbed by a vacuum cleaner, and a deposited toner amount was measured as a toner scattering amount. Based on the toner scattering amount, the long life property was evaluated according to the following criteria.

A: The toner scattering amount is 170 mg or less.
C: The toner scattering amount is more than 170 mg.

The toner of Example 1 had a minimum fixing temperature of 125° C., a maximum fixing temperature of 195° C., and a toner scattering amount of 130 mg.

The toner of Example 2 had a minimum fixing temperature of 118° C., a maximum fixing temperature of 195° C., and a toner scattering amount of 120 mg.

The toner of Example 3 had a minimum fixing temperature of 128° C., a maximum fixing temperature of 210° C., and a toner scattering amount of 160 mg.

The toner of Example 4 had a minimum fixing temperature of 125° C., a maximum fixing temperature of 205° C., and a toner scattering amount of 130 mg.

The toner of Example 5 had a minimum fixing temperature of 118° C., a maximum fixing temperature of 192° C., and a toner scattering amount of 140 mg.

The toner of Example 6 had a minimum fixing temperature of 128° C., a maximum fixing temperature of 194° C., and a toner scattering amount of 100 mg.

The toner of Example 7 had a minimum fixing temperature of 114° C., a maximum fixing temperature of 196° C., and a toner scattering amount of 160 mg.

The toner of Comparative Example 1 had a minimum fixing temperature of 128° C., a maximum fixing temperature of 178° C., and a toner scattering amount of 160 mg.

The toner of Comparative Example 2 had a minimum fixing temperature of 138° C., a maximum fixing temperature of 204° C., and a toner scattering amount of 160 mg.

The toner of Comparative Example 3 had a minimum fixing temperature of 118° C., a maximum fixing temperature of 188° C., and a toner scattering amount of 120 mg.

The toner of Comparative Example 4 had a minimum fixing temperature of 135° C., a maximum fixing temperature of 197° C., and a toner scattering amount of 190 mg.

The toner of Comparative Example 5 had a minimum fixing temperature of 128° C., a maximum fixing temperature of 192° C., and a toner scattering amount of 120 mg.

The toner of Comparative Example 6 had a minimum fixing temperature of 139° C., a maximum fixing temperature of 196° C., and a toner scattering amount of 140 mg.

The toner of Comparative Example 7 had a minimum fixing temperature of 119° C., a maximum fixing temperature of 191° C., and a toner scattering amount of 230 mg.

Evaluation results of the low-temperature offset resistance, the high-temperature offset resistance, and the long life property of the toner of each Example are shown in Table 1.

TABLE 1

| | Non-crystalline polyester A | | Non-crystalline polyester B | | Crystalline | Ester wax | | | Long |
| | $Tm_A$ [°C.] | A [mass %] | $Tm_B$ [°C.] | B [mass %] | polyester C [mass %] | residual ratio [%] | Low-temperature offset resistance | High-temperature offset resistance | life property |
|---|---|---|---|---|---|---|---|---|---|
| Example 1 | 104 | 55 | 145 | 25 | 10 | 85 | B | B | B |
| Example 2 | 99 | 55 | 140 | 25 | 10 | 95 | A | B | B |
| Example 3 | 108 | 55 | 150 | 25 | 10 | 75 | B | A | B |
| Example 4 | 104 | 50 | 145 | 30 | 10 | 80 | B | A | B |
| Example 5 | 104 | 60 | 145 | 20 | 10 | 85 | A | B | B |
| Example 6 | 104 | 58 | 145 | 27 | 5 | 90 | B | B | B |
| Example 7 | 104 | 52 | 145 | 23 | 15 | 80 | A | B | B |
| Comparative Example 1 | 98 | 55 | 138 | 25 | 10 | 85 | B | C | B |
| Comparative Example 2 | 110 | 55 | 152 | 25 | 10 | 85 | C | A | B |
| Comparative Example 3 | 104 | 65 | 145 | 15 | 10 | 97 | B | C | B |
| Comparative Example 4 | 104 | 45 | 145 | 35 | 10 | 70 | C | B | C |
| Comparative Example 5 | 104 | 40 | 132 | 40 | 10 | 70 | B | B | C |
| Comparative Example 6 | 104 | 60 | 145 | 27 | 3 | 97 | C | B | B |
| Comparative Example 7 | 104 | 50 | 145 | 23 | 17 | 65 | B | B | C |

In Table 1, a represents the ratio of the non-crystalline polyester resin A to total 100 mass % of the crystalline polyester resin, the non-crystalline polyester resin A, the non-crystalline polyester resin B, the ester wax, and the colorant. In addition, b is the ratio of the non-crystalline polyester resin B to the total 100 mass % of the crystalline polyester resin, the non-crystalline polyester resin A, the non-crystalline polyester resin B, the ester wax, and the colorant. Further, c is the ratio of the crystalline polyester resin to the total 100 mass % of the crystalline polyester resin, the non-crystalline polyester resin A, the non-crystalline polyester resin B, the ester wax, and the colorant.

The toners of Examples 1 to 7 were excellent in low-temperature offset resistance, high-temperature offset resistance, and long life property.

In contrast, in the toners of Comparative Examples 1 to 7, all of the low-temperature offset resistance, the high-temperature offset resistance, and the long life property did not reach the acceptance criteria at the same time. In particular, in Comparative Examples 4, 5, and 7, the ester wax residual ratio was less than 75%. Therefore, it is considered that the free ester wax contaminates the carrier and the charge amount of the toner decreases. As a result, the toner scattering amount was increased, and the long life property was deteriorated.

While certain embodiments have been described, these embodiments have been presented by way of example only, and are not intended to limit the scope of the disclosure. Indeed, the novel embodiments described herein may be embodied in a variety of other forms. Furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A toner comprising:
   a crystalline polyester resin;
   a non-crystalline polyester resin A having a melting temperature ranging between 99° C. to 108° C.;
   a non-crystalline polyester resin B having a melting temperature ranging between 140° C. to 150° C.;
   an ester wax; and
   a colorant, wherein
   a ratio of the crystalline polyester resin is 5 mass % to 15 mass % with respect to 100 mass % of a total of the crystalline polyester resin, the non-crystalline polyester resin A, the non-crystalline polyester resin B, the ester wax, and the colorant,
   a ratio of the non-crystalline polyester resin A is between 50 mass % to 60 mass % with respect to 100 mass % of the total of the crystalline polyester resin, the non-crystalline polyester resin A, the non-crystalline polyester resin B, the ester wax, and the colorant, and
   a ratio of the non-crystalline polyester resin B is between 20 mass % to 30 mass % with respect to 100 mass % of the total of the crystalline polyester resin, the non-crystalline polyester resin A, the non-crystalline polyester resin B, the ester wax, and the colorant.

2. The toner of claim 1, wherein
   an ester wax residual ratio calculated by the following equation is 75% to 95%,
   Ester wax residual ratio being $(\%) = (W_1/W_0) \times 100$,
   where $W_0$ is an endothermic amount (J/g) measured using a differential scanning calorimeter for the toner; and $W_1$ is an endothermic amount (J/g) measured using the differential scanning calorimeter for particles obtained by heating a dispersion liquid containing the toner, water, and a surfactant at 50° C. for 1 hour, then leaving the dispersion liquid at rest until a temperature thereof decreases to a room temperature, and then removing a supernatant liquid of the dispersion liquid to obtain a solid content, and drying the solid content.

3. The toner of claim 2, wherein the ester wax residual ratio is 78% to 92%.

4. The toner of claim 1, wherein
   the toner has a ratio of the ester wax of between 3% mass to 10% mass with respect to 100% mass of the total of the crystalline polyester resin, the non-crystalline polyester resin A, the non-crystalline polyester resin B, the ester wax, and the colorant.

5. The toner of claim 4, wherein
the toner has a ratio of the ester wax of between 4% mass to 9% mass with respect to 100% mass of the total of the crystalline polyester resin, the non-crystalline polyester resin A, the non-crystalline polyester resin B, the ester wax, and the colorant.

6. The toner of claim 1, wherein the non-crystalline polyester resin A has a melting temperature of ranging between 102° C. to 105° C.

7. The toner of claim 1, wherein a non-crystalline polyester resin B has a melting temperature of ranging between 142° C. to 148° C.

8. The toner of claim 1, wherein the ratio of the crystalline polyester resin is 7 mass % to 13 mass % with respect to 100 mass % of the total of the crystalline polyester resin, the non-crystalline polyester resin A, the non-crystalline polyester resin B, the ester wax, and the colorant.

9. The toner of claim 1, wherein the ratio of the non-crystalline polyester resin A is between 52 mass % to 58 mass % with respect to 100 mass % of the total of the crystalline polyester resin, the non-crystalline polyester resin A, the non-crystalline polyester resin B, the ester wax, and the colorant.

10. The toner of claim 1, wherein the ratio of the non-crystalline polyester resin B is between 22 mass % to 28 mass % with respect to 100 mass % of the total of the crystalline polyester resin, the non-crystalline polyester resin A, the non-crystalline polyester resin B, the ester wax, and the colorant.

11. The toner of claim 1, wherein the toner further comprises an external additive comprising an inorganic oxide.

12. The toner of claim 11, wherein the inorganic oxide is surface-treated with a hydrophobizing agent.

13. The toner of claim 1, wherein the non-crystalline polyester resin A has a mass average molecular weight of $9.0 \times 10^3$ to $1.5 \times 10^4$.

14. The toner of claim 1, wherein the non-crystalline polyester resin B has a mass average molecular weight of $2.5 \times 10^4$ to $3.4 \times 10^4$.

15. A toner cartridge comprising a container comprising a toner according to claim 1.

16. An image forming apparatus comprising a toner cartridge according to claim 15.

* * * * *